United States Patent [19]
Grohoski et al.

[11] Patent Number: 5,794,027
[45] Date of Patent: Aug. 11, 1998

[54] METHOD AND APPARATUS FOR MANAGING THE EXECUTION OF INSTRUCTONS WITH PROXIMATE SUCCESSIVE BRANCHES IN A CACHE-BASED DATA PROCESSING SYSTEM

[75] Inventors: Gregory Frederick Grohoski, Cedar Park, Tex.; Ravindra Kumar Nair, Briarcliff Manor, N.Y.

[73] Assignee: International Business Machines Corporation, Armonk, N.Y.

[21] Appl. No.: 803,649

[22] Filed: Feb. 21, 1997

Related U.S. Application Data

[63] Continuation of Ser. No. 317,425, Oct. 4, 1994, abandoned, which is a continuation of Ser. No. 86,677, Jul. 1, 1993, abandoned.

[51] Int. Cl.⁶ .................................................. G06F 9/38
[52] U.S. Cl. .................. 395/585; 395/376; 395/584; 395/586
[58] Field of Search .................. 395/376, 800, 395/584, 585, 586

[56] References Cited

U.S. PATENT DOCUMENTS

| | | | |
|---|---|---|---|
| 4,200,927 | 4/1980 | Hughes et al. | |
| 4,298,927 | 11/1981 | Berglund et al. | 364/DIG. 1 |
| 4,679,141 | 7/1987 | Pomerene et al. | |
| 4,691,277 | 9/1987 | Kronstadt et al. | |
| 4,714,994 | 12/1987 | Oklobdzija et al. | |
| 4,763,245 | 8/1988 | Emma et al. | |
| 4,775,927 | 10/1988 | Hester et al. | |
| 4,881,170 | 11/1989 | Morisada. | |
| 4,943,908 | 7/1990 | Emma et al. | |
| 4,984,154 | 1/1991 | Hanatani et al. | |
| 4,991,080 | 2/1991 | Emma et al. | |
| 5,075,840 | 12/1991 | Grohoski et al. | 364/DIG. 7 |
| 5,127,091 | 6/1992 | Boufarah et al. | 395/375 |
| 5,127,092 | 6/1992 | Gupta et al. | 395/375 |
| 5,142,634 | 8/1992 | Fite et al. | 395/375 |
| 5,146,570 | 9/1992 | Hester et al. | |
| 5,163,140 | 11/1992 | Stiles et al. | 395/425 |
| 5,168,557 | 12/1992 | Shibuya. | |
| 5,170,476 | 12/1992 | Laasko et al. | 395/425 |
| 5,226,126 | 7/1993 | McFarland et al. | 395/375 |
| 5,230,068 | 7/1993 | Van Dyke et al. | 395/375 |
| 5,233,702 | 8/1993 | Emma et al. | 395/425 |
| 5,265,213 | 11/1993 | Weiser et al. | 395/375 |
| 5,313,634 | 5/1994 | Eickemeyer | 395/700 |
| 5,327,547 | 7/1994 | Stiles et al. | 395/375 |
| 5,386,519 | 1/1995 | Nakamura et al. | 395/375 |
| 5,442,756 | 8/1995 | Grochowski et al. | 395/375 |
| 5,448,705 | 9/1995 | Nguyen et al. | 395/376 |
| 5,481,685 | 1/1996 | Nguyen et al. | 395/376 |
| 5,499,355 | 3/1996 | Krishnamohan et al. | 395/464 |
| 5,509,130 | 4/1996 | Trauben et al. | 395/376 |
| 5,524,224 | 6/1996 | Denman et al. | 395/376 |
| 5,539,911 | 7/1996 | Nguyen et al. | 395/800 |
| 5,560,032 | 9/1996 | Nguyen et al. | 395/800 |

FOREIGN PATENT DOCUMENTS

| | | |
|---|---|---|
| 0 394 624 A2 | 10/1990 | European Pat. Off. |
| 0 468 134 A2 | 1/1992 | European Pat. Off. |
| 0 509 245 A2 | 10/1992 | European Pat. Off. |

OTHER PUBLICATIONS

"IBM RISC System/6000 Technology", IBM Corporation, 1990, Order # SA23-2619-00.

*Primary Examiner*—Krisna Lim
*Assistant Examiner*—Saleh Najjar
*Attorney, Agent, or Firm*—Casimer K. Salys; Wayne P. Bailey

[57] ABSTRACT

A small buffer called a branch-anticipate buffer (BAB) is used to store groups of instructions which are likely to be required from the instruction cache (I-cache) when an instruction prefetch miss occurs. When a prefetch miss occurs, the BAB is checked to see if instructions corresponding to the target address are available. If they are available, these instructions are copied into an appropriate buffer. If the instructions corresponding to the target address are unavailable, these instructions are fetched from the I-cache and placed into a buffer and, selectively, into the BAB. The BAB only maintains branch target addresses that have not been previously scanned and that cannot be prefetched in time. This allows for smaller buffer sizes, and resulting quicker access time, when checking the BAB for instructions to be executed by a processor.

15 Claims, 6 Drawing Sheets

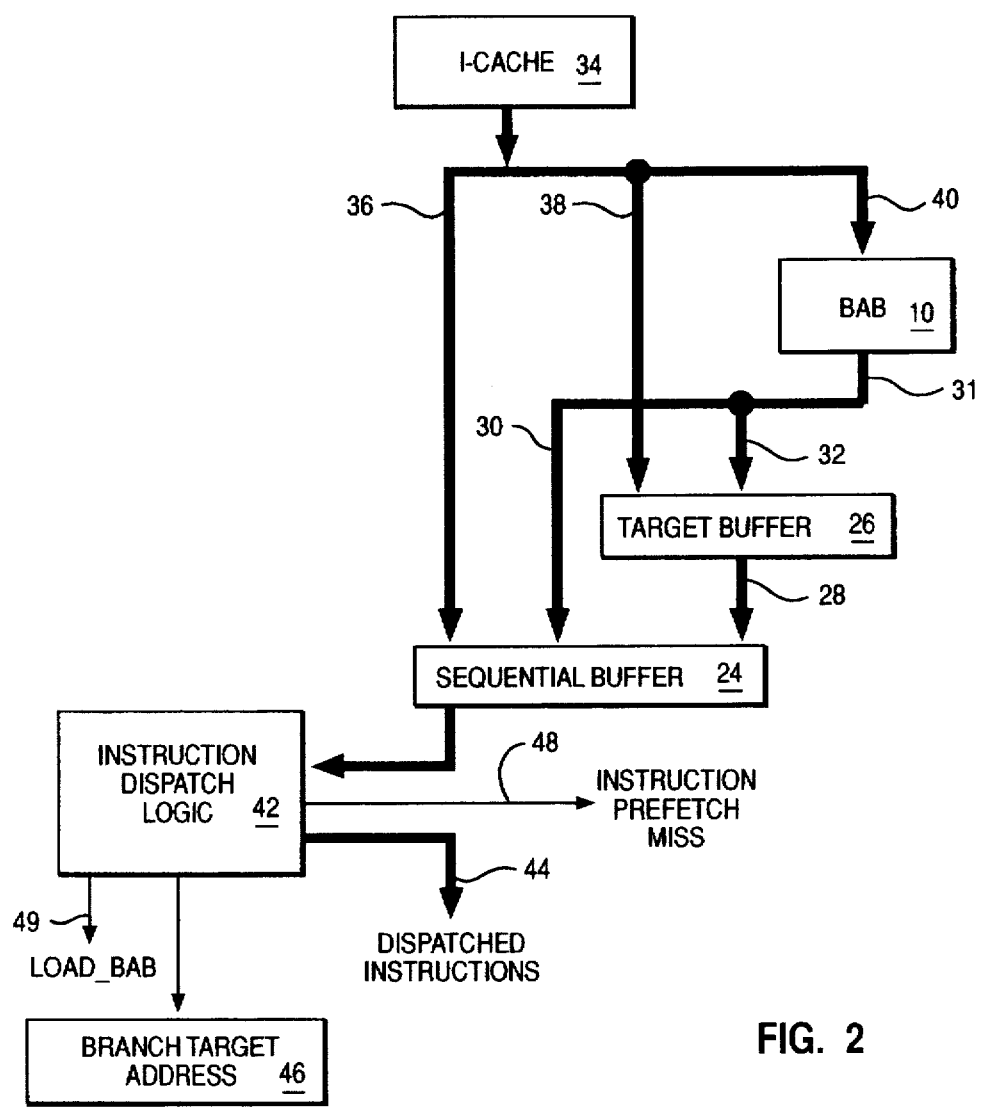

| CYCLE # | 1 | 2 | 3 | 4 | 5 | 6 | 7 | 8 | 9 |
|---|---|---|---|---|---|---|---|---|---|
| 144 — IF | S1 S2 B1 • | • • • • | X B2 • • | • • • • | T1 T2 T3 • | • • • • | • • • • | • • • • | • • • • |
| 146 — D | | S1 B1 | S2 | X B2 | | T1 | T2 | T3 | |
| 148 — E | | | S1 | S2 | X | | T1 | T2 | T3 |
| | 150 | 152 | 154 | 156 | 158 | 160 | 162 | 164 | 166 |

FIG. 6A

| CYCLE # | 11 | 12 | 13 | 14 | 15 | 16 | 17 | 18 |
|---|---|---|---|---|---|---|---|---|
| 104 — IF | S1 S2 B1 • | • • • • | X B2 • • | • • • • | T3 • • • | • • • • | • • • • | • • • • |
| 106 — D | | S1 B1 | S2 | X B2 | T1 | T2 | T3 | |
| 108 — E | | | S1 | S2 | X | T1 | T2 | T3 |
| | | | | 168 | 170 | 172 | | |

FIG. 6B

METHOD AND APPARATUS FOR MANAGING THE EXECUTION OF INSTRUCTONS WITH PROXIMATE SUCCESSIVE BRANCHES IN A CACHE-BASED DATA PROCESSING SYSTEM

This is a continuation of application Ser. No. 08/317,425 filed Oct. 4, 1994 abandoned, which is a continuation of application Ser. No. 08/086,677, filed on Jul. 1, 1993 abandoned.

TECHNICAL FIELD

This invention relates to a data processing system and to its resolution of branch instructions contained in the instruction stream executed by it. In particular, the invention relates to the reduction of delays due to close proximity of branches in instruction streams.

BACKGROUND OF THE INVENTION

Computer architectures are generally based on a sequential model of program execution, where each instruction in a program is fetched from memory, fully executed, and all results returned to memory before the next instruction is similarly dealt with. In this model, the next instruction executed is usually the one immediately following the one just executed, stored in a location in memory that has the next higher address with respect to the one just executed.

A location different from the next successive location may be specified in branch instructions, which occur with some frequency in typical computer programs. If the instruction to be executed next is the branch target, that is, the one specified in the branch instruction, then the branch is said to be taken. If the branch is always taken it is referred to as an unconditional branch. A conditional branch is taken depending on the state of the machine set by the preceding instructions, when the branch instruction is encountered. If the branch is not taken, the next sequential instruction is fetched and executed. Branch instructions thus enable conditional transfer of control to some path in the executing program different from the current one.

In simple implementations of this sequential model, the delay associated with branch instructions is not significant because the same method is used to access the next instruction whether it be the next sequential one or the one at a branch target. In overlapped implementations where one instruction is fetched while the previous one is still being executed, no delay is encountered as long as consecutive instructions are executed. When a branch is encountered, the fetched instruction may have to be abandoned in favor of a different target instruction depending on the instruction currently completing execution, thus causing a delay. In more contemporary implementations, more than one instruction may be completing execution while an instruction is being fetched. Thus the same number of machine cycles in branch delay represents a larger fraction of the total machine cycles required for execution of the program.

In reduced instruction set computers (RISC), a large portion of the machine instructions take only a single cycle to execute. This has increased the importance of caches, which are small memories to hold data and/or instructions that are most likely to be used in the near future. Because caches have access times considerably faster in comparison to traditional main memory, they help in maintaining a high rate of instruction execution as long as they effectively hold the required stream of instructions. When a branch instruction is encountered in a machine having a cache of the instruction stream (I-cache), it is possible that the target instructions are unavailable in the cache. A delay occurs due to the processor having to idle while the cache is loaded from main memory with the required stream of instructions.

A significant factor contributing to the high performance of machine organizations like the IBM RISC System/6000 [1] is the processing of branches by a separate branch processing unit. Hence, mechanisms as described, for example, in Grohoski G. F., "Machine Organization of the IBM RISC System/6000 Processor," IBM Journal of Research and Development, vol. 34, no. 1, January 1990, pp. 37–58, could be used to look ahead into the instruction stream to detect a branch and to fetch instructions from the target of the branch before they are actually encountered. When the branch is conditional, instructions from both the sequential stream as well as the target stream are maintained in separate buffers, so that the appropriate path can be taken without a cache access even when the branch condition is resolved late.

[1] Trademark of IBM Corporation

When the branch condition is resolved late, a delay may be incurred due to the need to switch from the buffer containing the sequential stream to the buffer containing the target stream. This delay could be reduced by guessing which path the conditional branch will actually take. No penalty is incurred if the guess is correct as lone as the first instruction executed immediately after the branch is not another branch. Prediction techniques have been described in the literature. One such technique is described in U.S. Pat. No. 4,991,080 and hereby incorporated by reference.

A branch target table, or BTT, may be used to increase system performance, as described in U.S. Pat. No. 4,691,277 and hereby incorporated by reference. The BTT holds instructions which are targets of branches. Whenever a branch is taken, the table is checked to see if the "branched to", or target, instruction is contained in the BTT. If so, the instructions are supplied to the execution unit from the BTT instead of from system memory. The BTT is used in lieu of an instruction cache. This type of system indiscriminately places every branch target instruction into the BTT when a branch is encountered. It further eliminates the use, and resulting advantages, of an instruction cache.

There are several situations where the proximity of branches causes the machine to wait until the branch unit fetches the appropriate stream of instructions from the instruction cache. For example, when a taken conditional branch has a target that is also a branch, preprocessing and branch prediction can help in prefetching the target stream of instructions for the first branch, but the target stream for the second branch is unavailable in time. This is termed an "instruction prefetch miss". Thus, once branch prediction techniques are implemented to reduce the delay due to unresolved conditional branches, instruction prefetch misses due to close proximity of branches become the major contributor to branch delays. Moreover, as the number of instructions that can be executed in a single cycle increases, this branch delay increasingly limits the overall performance of the data processing system.

SUMMARY OF THE INVENTION

It is an object of this invention to improve the overall system performance of a data processing system.

It is another object of the present invention to improve the rate at which instructions are executed by a processor.

It is yet another object of the present invention to minimize processor idle time during instruction cache reload.

In this invention, a small buffer called a branch-anticipate buffer (BAB) is used to store groups of instructions which are likely to be required from the instruction cache (I-cache) when an instruction prefetch miss occurs. In the preferred embodiment this buffer is 32 entries long, but it could be any size within the size constraints of the integrated circuit design. When a prefetch miss occurs, the BAB is checked to see if instructions corresponding to the target address are available. If they are available, these instructions are copied into an appropriate buffer, the sequential buffer if the branch has already been resolved, or the target buffer if the branch is yet to be resolved. If the instructions corresponding to the target address are unavailable, these instructions are fetched from the I-cache and placed into the sequential/target buffer and, selectively, into the BAB.

In order to limit the size of the BAB and to reduce its access time, the BAB is organized as a direct-mapped buffer with 32 entries in the preferred embodiment, each entry storing four (4) adjacent instructions. The address of the first instruction is also stored in each entry, and is compared with the desired target address before copying into the sequential buffer. A validity bit, incorporated with each entry, is a logical one only if the entry is valid for the current address space.

The BAB is indexed by hashing the target address bits. Since bits 30–31 of a valid instruction address are always logical zero, a simple scheme is to use bits 25–29 of the address to index into the BAB. If earlier access to the BAB is desired, the buffer may be indexed by hashing the address of the branch that caused the prefetch miss, rather than the target of that branch.

A key feature of the present invention is that the BAB only maintains selective branch target addresses. Only branch target addresses that have not been previously scanned, and that cannot be prefetched in time, are stored in the BAB. This allows for smaller buffer sizes, and resulting quicker access time, than traditional techniques known in the art such as a BTT.

BRIEF DESCRIPTION OF THE DRAWINGS

FIG. 1 shows the overall organization of the Branch Anticipate Buffer (BAB).

FIG. 2 is the block diagram depicting the relationship of the BAB with the instruction prefetch buffers and instruction on cache.

FIGS. 6A–6B show a pipeline timing diagram.

DETAILED DESCRIPTION OF THE PREFERRED EMBODIMENTS

Figure 3A:
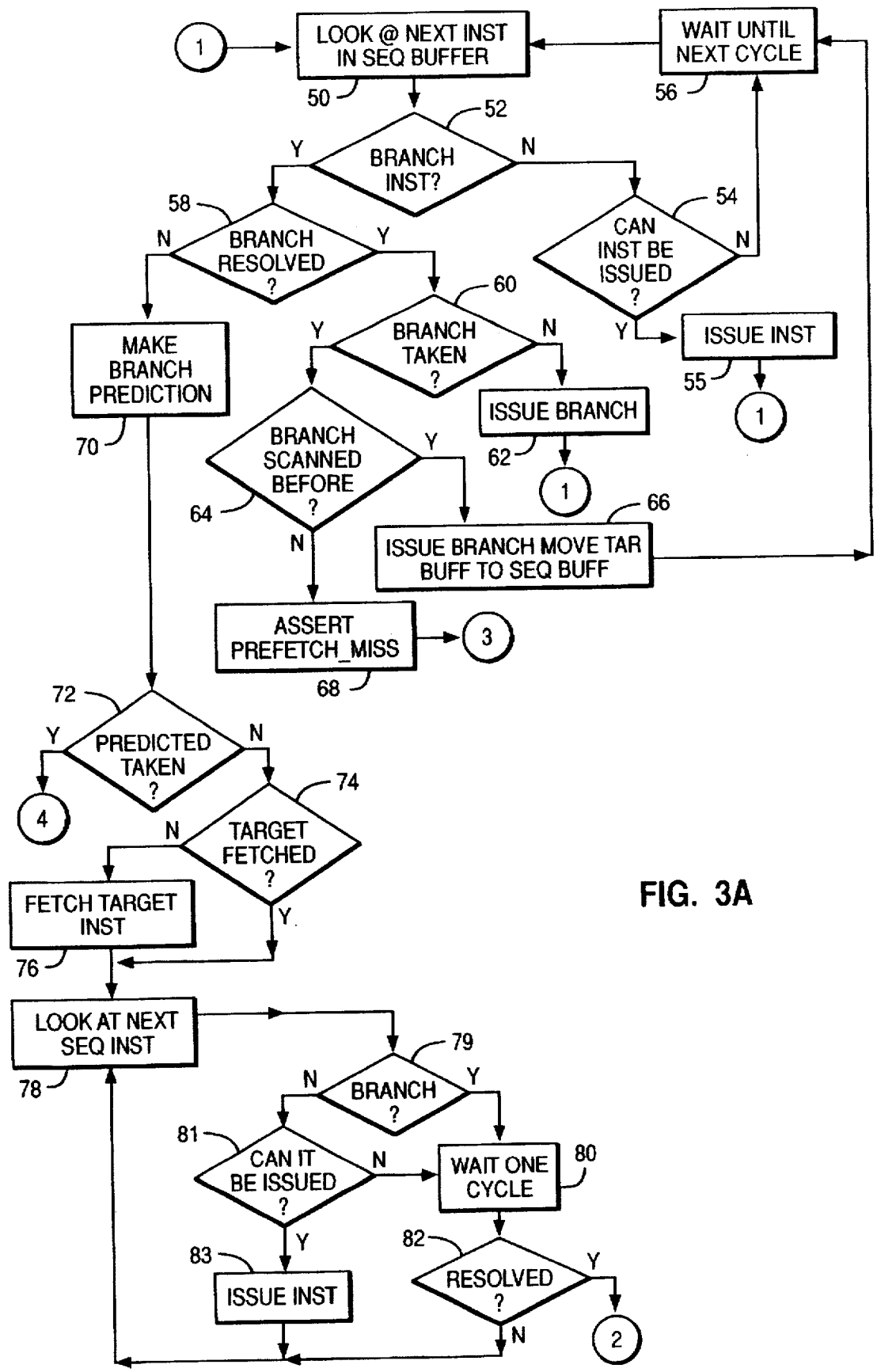
FIGS. 3A–3D are the control flow for the instruction dispatch logic.

The Branch Anticipate Buffer (BAB) 10 is essentially a random-access memory organized as shown in FIG. 1. It is a 32 entry table having 161 bits per word/entry. Each entry in the table is accessed using a 5 bit decoder. The 161 bits in each entry includes a valid bit 12 which when a logical '1' indicates that the corresponding entry is valid, and when a logical '0' indicates that the corresponding entry is not valid. The remaining 160 bits contain five(5) 32-bit words at 14, 16, 18, 20 and 22, the first word being an address and the remaining four words being a copy of the next four(4) adjacent machine instructions beginning at that address in main memory.

FIG. 2 depicts the relationship of the BAB 10 with the rest of the instruction fetch mechanism, which has been shown in a simplified form. A more detailed form can be obtained from Grohoski G. F., "Machine Organization of the IBM RISC System/6000 Processor," IBM Journal of Research and Development, vol. 34, no. 1, January 1990, pp. 37–58 and hereby incorporated by reference as background material. A sequential buffer 24 containing up to 4 instructions and a target buffer 26 containing up to 4 instructions are shown. Paths are shown to transfer the contents of the target buffer to the sequential buffer at 28 and of the addressed BAB entry to either the sequential or the target buffer at 30 and 32. Also depicted is an I-cache 34 which has a path to both the sequential and target buffers and to the BAB at 36, 38 and 40, respectively. Also shown is a block of logic called the instruction dispatch logic 42, which performs inter lock analysis on the instructions in the sequential buffer 24, scans the sequential buffer for branches, performs branch prediction, address calculation and branch resolution to execute the branches, and dispatches instructions at 44 that are ready for execution to the fixed-point and floating-point functional units. The instruction dispatch logic also presents the target address at 46 to both the I-cache 34 and the BAB 10 in order to prefetch instructions. The instruction dispatch logic also generates a load_BAB signal 49, indicating that the BAB is to be loaded with a target instruction stream, as will be further described below with reference to FIG. 4.

The operation of the instruction dispatch logic 42 will now be described with reference to FIGS. 3A–3D. The sequential buffer is scanned at 50 for the first branch even as the non-branch instructions are issued by the instruction dispatch logic 42. If the next instruction in the sequential buffer is not a branch, as determined at 52, then at least one instruction is guaranteed to be issued by the instruction dispatch logic without delay before a branch is encountered. A determination is made at 54 on whether the non-branch instruction can be issued. If so, the instruction is issued at 55 and processing then continues at 50. If not, instruction issue is suspended until the next cycle (block 56), and then processing resumes at 50. If a branch instruction was found at 52, processing continues at 58.

Returning to block 52, if the next instruction in the sequential buffer is a branch, then a determination is made as to whether the branch has been resolved (i.e. whether the system knows yet whether the branch will be taken or not) at 58. If the branch is resolved or unconditonal (which is resolved by its very nature of being unconditional, then a determination is made at 60 on whether the branch is to be taken or not. If the branch is not taken, the branch is issued at 62 and processing continues at 50. Issuing, or executing, a branch in this particular scenario (i.e. where the branch is not taken) means to remove the branch instruction from the appropriate buffer, and possibly update registers. If the branch is taken at 60, then a determination is made on whether the branch has previously been scanned by the instruction prefetch logic at 64. If the instruction is a branch that has been scanned in a previous cycle, then the target instructions should be available in the target buffer. In this case, the branch is issued and the target buffer is moved to the sequential buffer at 66. Processing then continues at 50. If the branch was not previously scanned before, as determined at 64, then the target of this branch is not available in the target buffer 26. An instruction prefetch miss signal (48 of FIG. 2) is asserted at 68, indicating that the instruction cannot be prefetched from the I-cache without a delay since it is in a critical path of execution. Processing then continues at 110 of FIG. 3C, to be further described below.

Returning to Block 58, if the branch has not yet been resolved, then a branch prediction is made at 70 to guess/predict whether the branch will be taken or not. As discussed in the background section, branch prediction can improve system performance by prefetching an instruction stream. If the branch is predicted to be taken at 72, processing continues at FIG. 3D, and further described below, to determine if the branch instruction has previously been scanned by the instruction dispatch logic. If the branch is predicted to not be taken at 72, a check is made at 74 on whether the target instruction has been fetched. If so, nothing remains to be done with the prefetched target instruction, and the next sequential instruction is interrogated at 78. If the target instruction has not been fetched (as determined at 74), it is fetched into the target buffer at 76 from either the BAB (if the target instruction is contained in the BAB) or I-cache (if the target instruction is not contained in BAB). The target buffer is used to maintain target instructions that may be needed in the event the branch prediction was wrong, and thus where the needed target instruction is not in the sequential buffer. This saves a cycle in the case of a wrong guess by being able to immediately supply the target instruction to the execution unit, instead of having to access the slower I-cache. After fetching the target instruction into the target buffer, the next instruction in the sequential buffer is checked at 78. If it is a branch instruction, as determined at 79, processing is delayed for one cycle at 80. If it is not a branch instruction, a check is made at 81 on whether the non-branch instruction can be issued. If the instruction can be issued, it is issued at 83 and processing then continues at 78. If the instruction cannot be issued (as determined at 81), processing is delayed for one cycle at 80.

After the delay of Block 80, for either a branch instruction or a non-branch instruction that cannot yet be issued, the dispatch logic checks at 83 to see if the prefetched branch instruction detected at block 52 has yet been resolved (understanding that sequential instructions are being issued/executed from the sequential buffer that may allow for such resolution of whether the branch is to be taken or not). If the branch instruction has not yet been resolved, scanning of the sequential buffer continues at 78. However, if the branch has been resolved at 82, processing continues at FIG. 3B.

Figure 3B:
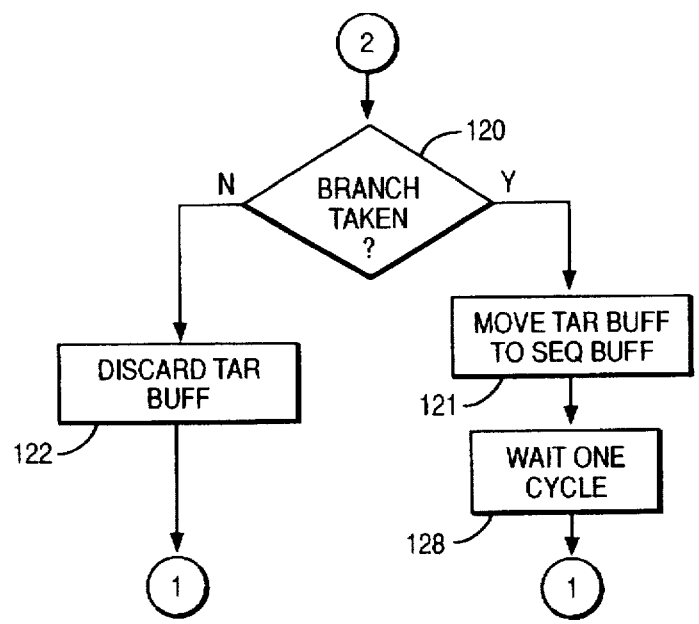

FIG. 3B depicts the instruction prefetch logic when a branch instruction has been predicted to not be taken and the branch has been resolved late. A determination is made at 120 on whether the branch is to actually be taken. If the branch is not taken (i.e. the branch prediction was correct), the target buffer is discarded at 122 (since the target instructions therein are not needed, as the branch is not taken). Processing then resumes at block 50 of FIG. 3A.

If the branch is taken at 120 (i.e. the branch prediction was incorrect), the contents of the target buffer are moved to the sequential buffer at 121. A one cycle delay occurs at 128 (since in the preferred embodiment only one stream is issued at a time), followed by resumed processing at 50 of FIG. 3A.

Figure 3C:
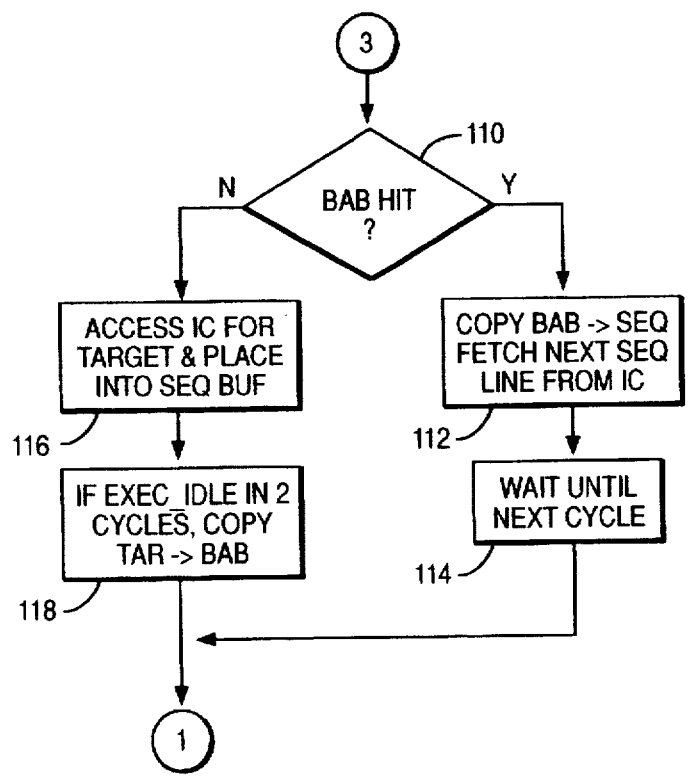

FIG. 3C depicts the operations of the instruction prefetch logic when it has been determined that there is a branch instruction that is to be taken, but the instruction has not previously been scanned. The distinction on whether the instruction has been previously scanned allows for selective update of the BAB, as will be later described. A check is made at 110 to see if there is a BAB hit (i.e. if the target instruction stream is in the BAB), by presenting the target address of the branch to both the I-cache and BAB in parallel. If there is a BAB hit, the associated BAB contents are copied into the sequential buffer, and the next sequential line following the last BAB value is fetched from the I-cache, at 112. Processing is delayed until the next cycle at 114, and then continues at 50. This ability to load the next instructions from the BAB at 112, when a BAB hit occurs, eliminates an idle execution cycle that would otherwise be required while loading the sequential buffer from the I-cache at 116.

Also when there is a hit in the BAB, the fetch address presented to the I-cache must be incremented so that the proper instructions subsequent to those obtained from the BAB are obtained. Since there are four instructions accessed from the BAB when a BAB hit occurs, with each instruction being 4 bytes long in the preferred embodiment, then the fetch address to the I-cache is incremented by 16 to point to the next instruction following the last one in the BAB entry.

If there is not a BAB hit as determined at 110, then the I-cache must be accessed for the target instruction stream. The target instruction stream is read from the I-cache and placed into the sequential buffer at 116. Filtering/selective updating of the BAB then occurs, as the target instruction stream not previously scanned is not in the BAB. If it is determined that the execution unit is idle (such idle occuring two cycles later in the preferred embodiment), then the target instruction stream is also copied into the BAB at 118. Thus, the target instruction stream is loaded or copied substantially concurrently into both the sequential buffer and the BAB. The idle execution unit indicates that this instruction stream is likely to be required in subsequent executions of this instruction code path, thus allowing for selective update of the BAB only with values that are likely to improve performance if readily available. This indication results from the fact that the idle cycle is caused by a subsequent branch instruction being in close proximity with an earlier branch, such that the target instruction of the second branch instruction has not yet been fetched. Processing then continues at 50.

Figure 3D:
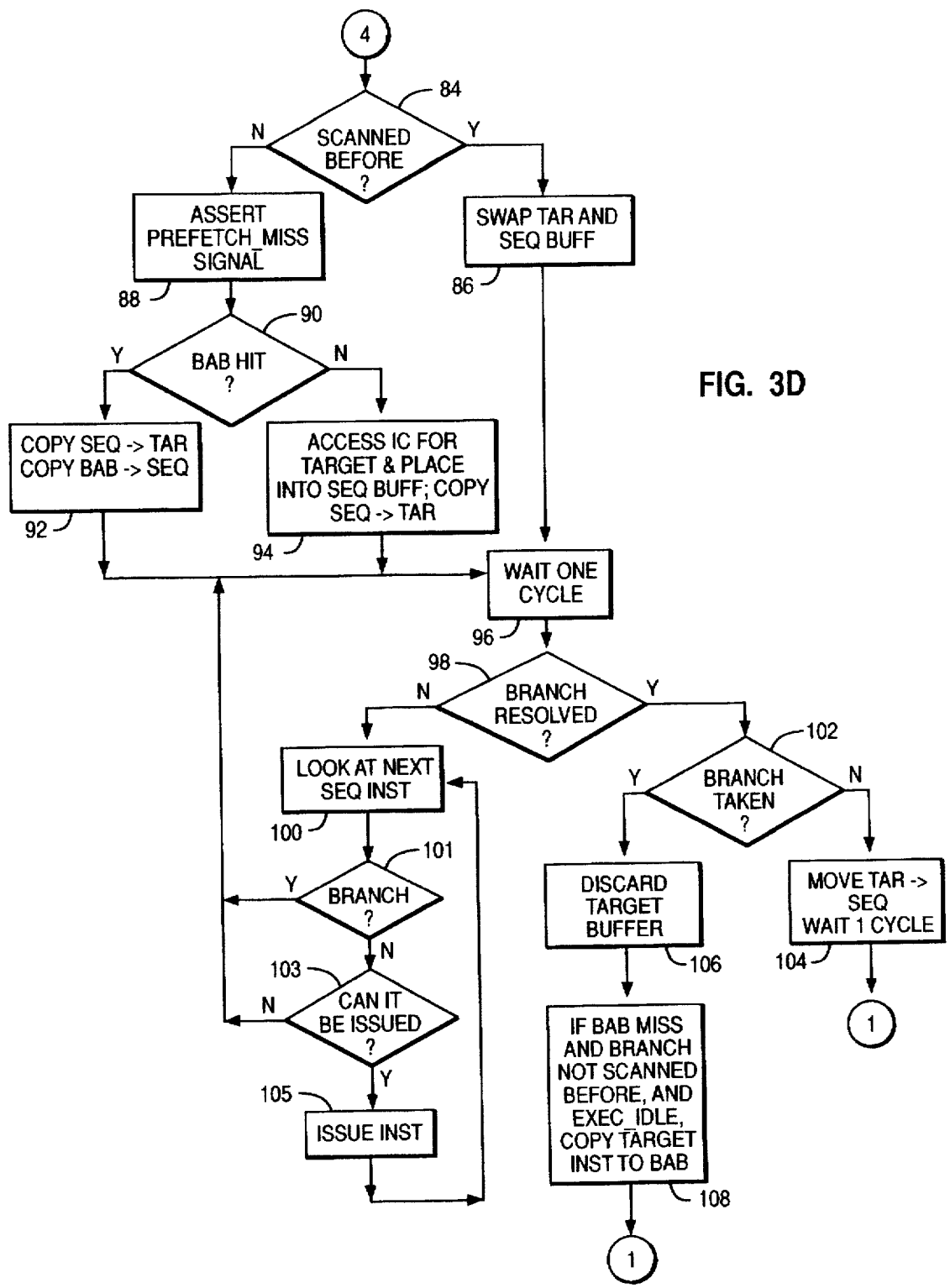

Returning to FIG. 3A, if the branch is predicted to be taken at 72, processing continues as shown in FIG. 3D. FIG. 3D shows the operation of the instruction prefetch logic when an unresolved branch is predicted to be taken. A check is made at 84 to determine if the branch instruction has previously been scanned, in a like fashion and for similar reasons to that of step 64 in FIG. 3A. If the instruction has been previously scanned, the target and sequential buffers are swapped at 86. Note that if the branch is resolved after the target instructions have been fetched into the sequential buffer, and if the branch is incorrectly predicted taken, then the instructions immediately following the branch have to be prefetched. The penalty due to this can be reduced by swapping these instructions into the target buffer when they are overwritten with new instructions from the I-Cache/BAB. Returning to 84, if the instruction has not been previously scanned before, a prefetch_miss signal is asserted at 88. A check is then made at 90 to determine if the branch target address is located in the BAB (i.e. a BAB hit). If there is a BAB hit, the sequential buffer is copied to the target buffer at 92. This provides a temporary storage for the sequential buffer's contents in the event that the branch prediction logic proves to be wrong, as will be checked at 102. The BAB is then copied into the sequential buffer at 92. This again shows how the BAB improves performance by immediately providing an instruction stream to the sequential buffer without having to access the I-cache. If there is not a BAB hit as determined at 90, the I-cache is accessed for the target instruction stream, which is placed in the sequential buffer at 94. Also at 94, the sequential buffer contents are placed into the target buffer.

After the operations of 86, 92 and 94 of FIG. 3D, the instruction prefetch logic waits until the next cycle at 96. A check is then made at 98 to determine whether the branch instruction has yet been resolved. If not resolved, the next instruction from the sequential buffer is checked at 100. If it is a branch instruction, as determined at 101, processing is delayed for one cycle at 96. If it is not a branch instruction, a check is made at 103 on whether the non-branch instruction can be issued. If the instruction can be issued, it is issued at 105 and processing then continues at 100. If the instruction cannot be issued (as determined at 103), processing is delayed for one cycle at 96.

Figure 4:
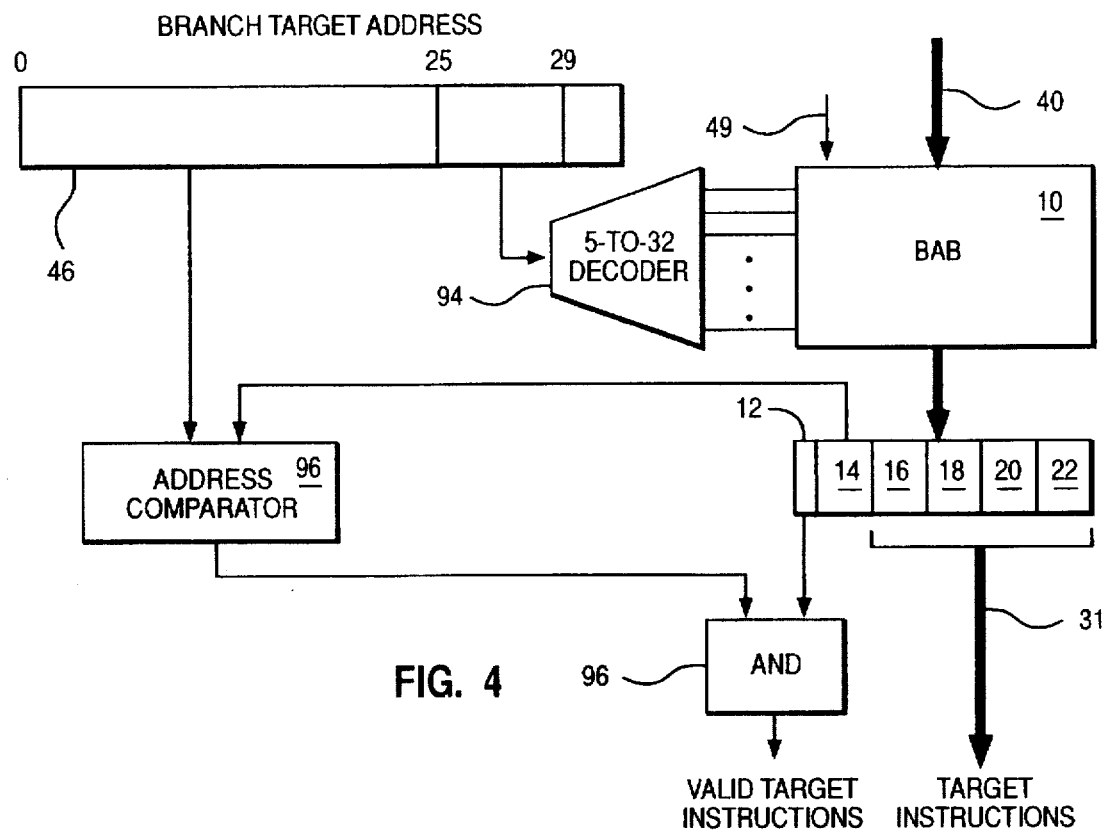
FIG. 4 shows how the BAB is accessed using the address provide to it by the instruction dispatch logic.

If the branch instruction has been resolved at 98, a check is made on whether the branch is taken at 102. If the branch is not taken (i.e., the branch prediction was incorrect), the contents of the target buffer are moved to the sequential buffer at 104. This is required to restore the contents of the sequential buffer which were swapped with the target buffer at 86. The extra step is caused by the fact that the branch was erroneously predicted to be taken at 72, and in fact was not taken as determined at 102 A one cycle delay occurs at 104, due to the stream change operation, and processing then continues at 50. If the branch is taken as determined at 102 (i-e. the branch prediction was correct), the target buffer is discarded at 106, since it contains the unused sequential instructions. This is followed by the BAB filtered/selective update step at 108. Here, the BAB is only updated with the target instruction stream if there is a BAB_miss and an idle cycle in the execution unit, as will be further described below. This target instruction stream, which are the values to potentially be loaded into the BAB, are maintained in a conventional temporary register (not shown). An alternate embodiment would be to extend the BAB to include an additional, temporary location for maintaining the target instruction stream. After step 108, processing continues at 50. FIG. 4 shows how the BAB 10 is updated/accessed using the branch target address 46 provided to the BAB 10 by the instruction dispatch logic 42 (of FIG. 2). Bits 25–29 of the branch target address 46 are decoded at 94 to access one of 32 entries in the BAB 10. If the load_BAB signal is asserted (the generation of which is later described herein), the target address as well as 4 instructions come in from the I-cache (34 of FIG. 2) at 40, and get written into the addressed entry. By using the load_BAB signal to enable the loading of instructions into the BAB, only a minimal number of instructions which are anticipated as being subsequently executed are actually loaded into the BAB. Thus, the BAB is kept small and nimble.

To access the BAB 10, the addressed entry is read out and sent to the appropriate buffer, sequential or target, if the valid bit is set and if the target address matches the contents of the target address field associated with the entry as determined at 96 and 98.

An alternative scheme could also be used to address the BAB. Instead of using the target address as the matching field (see, e.g. 14 of FIGS. 1 and 4), the address of the branch instruction causing the branch could be used. In this approach, the BAB could be accessed without waiting for the branch target address to be computed. In this case, both the branch target address and the address of the branch instruction are stored in the BAB. However, using this alternative address (the causing instruction address, as opposed to the resulting instruction address) complicates the control scheme since now a check must be made that the proper target instructions were fetched, as a branch instruction may branch to different places on subsequent executions (i.e. it may generate a different target address). This address confirmation is accomplished by comparing the branch target address stored in the selected BAB entry with the branch target address generated by the instruction.

Instruction confirmation is further required since it is possible that the BAB could have an address match but the corresponding instructions are wrong. This could occur in a multi-processing environment, where multiple processes or programs are executing concurrently, and swapped in/out of memory upon their respective activation/deactivation. This is easily handled by simply marking the BAB entries invalid whenever a cache synchronize, or equivalent, instruction is executed. This instruction, or its equivalent, exists in multiprocessing operating systems to instruct the underlying hardware that the cache(s) must be resynchronized due to processes swapping into/out of memory.

When a new entry needs to be written to the BAB and the BAB is full, a preexisting entry needs to be replaced. This is accomplished using techniques commonly known in that art, such as an LRU method (which discards the least-recently used entry), a partitioned LRU method (LRU within certain compartments which does not necessarily pick the LRU entry over all 32 entries), etc. An example of a partitioned LRU embodiment follows. If there are four potential places for each entry (i.e. the congruence class is of size four), it is partitioned into two partitions with two entries in each partition. Associated with each congruence class is a bit which directs to the desired LRU partition (e.g. a logical zero bit value would direct to partition 0, and a logical one bit value would direct to partition 1). Associated with each partition is a bit which directs to the LRU entry within that partition.

Figure 5:
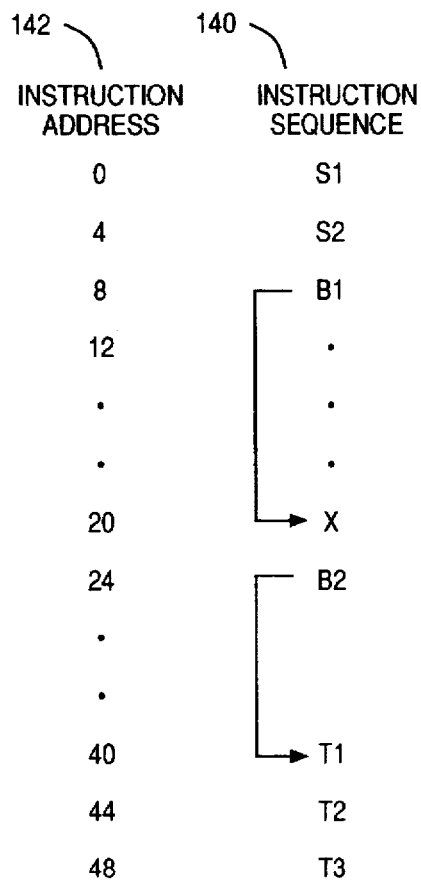
FIG. 5 shows sample instruction sequence to be processed.

FIG. 5 shows a sample instruction sequence 140 beginning at a relative instruction address of 0 (shown at 142). An instruction sequence to be decoded is shown at 140. For the example shown, the instructions are 4 bytes long, with the first instruction S1 having an instruction address of 0, the second instruction S2 having an instruction address of 4, etc. Instruction address 8 contains the third instruction in this instruction sequence, which is a branch instruction B1. This branch instruction has a target address of 20 having a target instruction X. Immediately following the target instruction X is another branch instruction B2 located at instruction address 24. The target address of this second branch instruction B2 is 40, where second target instruction T1 resides. Further sequential instructions T2 and T3 follow this T1 instruction, at instruction addresses 44 and 48, respectively.

FIG. 6A shows the pipeline timing diagram for the instruction sequence of FIG. 5 which is to be decoded and executed by a system not having a BAB. There are three stages for reading and executing an instruction sequence. The first phase is the instruction fetch stage 144, and denoted by 'IF' in FIG. 6A. Here, the next instruction to be executed is read out of the I-cache. The second stage is the decode stage 146, and denoted by 'D' in FIG. 6A. Here, an integer instruction is decoded, branches are processed, and target addresses are generated. Finally, the third stage is the execution cycle 148, denoted by 'E' in FIG. 6A. The execute stage executes integer instructions. In further describing the format of FIG. 6A, various cycles are shown at 150, 152, 154, . . . and 166.

During the first cycle 110, instructions S1, S2 and B1 are fetched. In the preferred embodiment, four instructions are fetched at a time. However, the fourth instruction following the branch instruction B1 is of no consequence to the current discussion or invention, and is not shown in order to minimize extraneous matter in the drawing. During the second cycle 152, the instructions are decoded. Note that B1 is decoded prior to S2 because further branch processing and target address generation are needed. The resulting target address of B1 can then be fetched by IF 144 while S2 is being decoded by D 106 during the third cycle 154. Note also that S1 is being executed by E 148 during this third cycle 154.

In a manner similar to that described above for the second cycle 152, the fourth cycle 156 decodes instruction X and B2 by D 146. Continuing with the fourth cycle 156, the S2 instruction is executed by stage E 148.

During the fifth cycle 158, the branch target address for B2, as determined during the fourth cycle 156, is known to be 40 (see FIG. 5). Instructions T1 and T2 are fetched from address location 40 by stage IF 144. Also during this fifth cycle, the target instruction from the first branch B1 is available for execution by stage E 158. So far, the pipeline has been full from cycles 3–5, with no idle execution stages. However, in cycle 6 this execution stage does become idle (i.e. no instruction is being executed by E 148. This idling of the execution unit during the sixth cycle 160 is caused by the second branch B2 occurring within the instruction sequence a short distance from the target address of a previous branch instruction. Due to this close proximity between target instruction addresses and a subsequent branch, the normally efficient 3-stage fetch/decode/execute processing is delayed, since the target of the second branch instruction was computed in the fourth cycle 156, fetched in the fifth cycle 158, and decoded in the sixth cycle 160. It is thus not available for execution until the seventh cycle 162, causing a one cycle delay. The seventh and eighth cycles 164 and 166 are shown for completeness, with normal decode and execute processing for instructions T2 and T3.

To summarize, the determination of the target address for B2 was delayed such that the target instruction for B2, which is T1 (at target address 40) could not be fetched early enough. This caused an idle cycle in the processor execution stage E 148.

The present invention solves this problem using a branch anticipate buffer (BAB), as previously described. In addition, the following signals are generated and used to control access (e.g. reading and writing) to the BAB. First, a prefetch_miss signal is generated by the decode stage D 146 when a determination is made that a branch is being taken. Second, an execution_idle signal is generated, which is generated by the execution stage E 148 (and activated during cycle 6 in the example shown in FIG. 6A). This idle cycle can be attributed to the prefetch_miss signal generated two cycles earlier. Thus, a load_BAB signal used to load the BAB with a new entry can be described to be:

load_BAB[i]:=execution_idle[i]&prefetch_miss[i−2]

where the subscript i denotes a particular clock cycle (e.g. 150–166 of FIG. 6A). In FIG. 6A, the load_BAB signal would become active during cycle 6 to load the BAB with the target instructions. Note also that load_BAB would not be active during cycle 4, since the E stage 148 was busy, thus preventing the loading of instructions X and B2 into the BAB unnecessarily.

The use of the load_BAB signal to load the BAB with target instructions provides significant performance improvements. The BAB is only loaded with values that have a high probability of being target instructions of a previously executed branch instruction. Since the loading of the BAB is filtered using the control signals described above, other previously loaded values in the BAB are not unnecessarily flushed. As a result, the required size of the BAB is smaller than the BTT known in the art.

FIG. 6B shows a pipeline timing diagram similar to that of FIG. 6A. However, FIG. 6B shows the BAB effect, as described hereinabove, of processing the instruction sequence of FIG. 5. The first time through the instruction sequence of FIG. 5, assuming the targets of B1 nor B2 were in the BAB, the same cycle behavior of FIG. 6A would apply (i.e. during the sixth cycle 160 the E stage 148 would be idle). The second time through, however, assume the target of B2 (instruction T1) was in the BAB as a result of the previous load_BAB signal being generated (and thus loading the BAB with T1). During the fourteenth cycle 168, a BAB_hit signal would be generated in response to finding the target of B2 (instruction T1) in the BAB. If the BAB entry were 2 instructions deep, and 2 valid instructions were there, the address of T3 would be generated so that T3 could be fetched from the I-cache during the fifteenth cycle 170 (Note, however, that in the preferred embodiment, the BAB is 4 instructions deep. Thus, T3 would already be in the BAB just like T2 is, since it is within four instructions of T1. This subsequent fetching of T3 from the I-cache for a two-deep BAB would not be required for a four-deep BAB. The two-deep BAB is merely shown as a further example as to how differing BAB depth sizes would be accommodated). The E stage 148 during the sixteenth cycle 172 is not idle. This is because the target of B2 (instruction T1) was read from the BAB during the fifteenth cycle 170, instead of having to be read from the slower accessed I-cache as was done in the fifth cycle 158 (of FIG. 6).

As can be seen from the foregoing description, by maintaining a small BAB that can be quickly accessed, execution idle cycles can be further reduced or eliminated. The quick access is achieved by only maintaining in the BAB anticipated branch instructions that are determined as a result of an instruction prefetch miss being detected. This allows for smaller buffers than those required by traditional BTT designs, where selective filtering of target instructions is not done.

While the invention has been shown and described with reference to particular embodiments thereof, it will be understood by those skilled in the art that the foregoing and other changes in form and detail may be made therein without departing from the spirit and scope of the invention.

We claim:

1. A system for managing instructions that are likely to be executed when an instruction prefetch miss occurs, comprising:

an execution unit for processing instructions;

a branch buffer for storing select instructions;

means for detecting an instruction prefetch miss, the instruction prefetch miss indicating that a first target instruction is a branch instruction having a second target instruction which is unavailable;

means for detecting an idle execution unit, the idle execution unit characterized by the absence of executable instructions;

means for selectively loading the second target instruction into said branch buffer responsive to successive detections of an instruction prefetch miss by the means for detecting an instruction prefetch miss and an idle execution unit by the means for detecting an idle execution unit;

means for determining whether said branch buffer is storing a target instruction, responsive to the means for detecting an instruction prefetch miss; and means for selectively accessing target instructions in the branch buffer responsive to the means for determining.

2. The system of claim 1 further comprising means for transferring said second target instruction into a buffer accessible to the execution unit.

3. The system of claim 2 wherein said means for transferring said second target instruction comprises a means for transferring said second target instruction into a sequential buffer if said second target instruction is an unconditional branch and for transferring said target instruction into a target buffer if said target instruction is a conditional type branch instruction which has yet to be resolved.

4. A system for improving system performance in a data processing system, comprising:

a processor for executing instructions;

a cache, connected to said processor;

a buffer, connected to said cache and said processor, having at least one processor instruction to be executed by said processor if an instruction prefetch miss is detected within the system;

means for detecting an instruction prefetch miss, the instruction prefetch miss indicating that a first target instruction is a branch instruction having a second target instruction which is unavailable;

means for detecting an idle processor the idle execution unit characterized by the absence of executable instructions; and means for selectively loading, in response to successive detections of an instruction prefetch miss by the means for detecting an instruction prefetch miss and an idle processor by the means for detecting an idle processor for a branch type instruction being processed by the processor, said buffer with said at least one processor instruction.

5. A system for improving system performance in a data processing system, comprising:

a processor for executing instructions;

a branch unit, connected to said processor;

a sequential buffer, connected to said branch unit;

a target buffer, connected to said branch unit;

a branch anticipate buffer, connected to said branch unit;

an instruction cache, connected to said sequential buffer, said target buffer, and said branch anticipate buffer;

means for detecting an instruction prefetch miss, the instruction prefetch miss indicating that a first target instruction is a branch instruction having a second target instruction which is unavailable;

means for detecting an idle processor the idle execution unit characterized by the absence of executable instructions; and means for loading, in response to successive detections of an instruction prefetch miss by the means for detecting an instruction prefetch miss and an idle processor by the means for detecting an idle processor for a branch type instruction being processed by the processor, said branch anticipate buffer with said at least one processor instruction.

6. The system of claim 5 wherein said at least one processor instruction is stored in said instruction cache.

7. The system of claim 5 further comprising concurrent means for loading said branch anticipate buffer and said target buffer with said at least one processor instruction substantially concurrently.

8. The system of claim 7 wherein said target buffer is load if said at least one processor instruction is a conditional type branch instruction which has yet to be resolved.

9. The system of claim 5 wherein said branch anticipate buffer and said sequential buffer are loaded by said means for selective loading with said at least one processor instruction substantially concurrently.

10. The system of claim 9 wherein said sequential buffer is loaded by said means for selective loading with instructions if said at least one processor instruction is an unconditional branch.

11. The system of claim 9 further comprising means for predicting whether an unresolved branch should be taken or not.

12. The system of claim 11 wherein said target buffer is loaded by said means for selective loading with instructions if said at least one processor instruction is an unresolved conditional branch instruction which by prediction means is predicted not to be taken.

13. The system of claim 7 further comprising means for predicting whether a branch should be taken or not taken.

14. The system of claim 13 wherein said sequential buffer is loaded by said means for selective loading with instructions if said at least one processor instruction is an unresolved conditional branch instruction which is predicted to be taken.

15. A method for executing a sequence of instructions by a data processor, comprising the steps of:

executing an instruction by the processor;

determining whether an instruction is a branch instruction;

detecting an idle processor, characterized by the absence of executable instructions, following the execution by the processor of a branch instruction having a prefetch miss;

selectively storing target instructions for branch instructions in a branch anticipation buffer responsive to the detection of an idle processor and a prefetch miss; and selectively accessing said branch anticipation buffer to obtain a stored target instruction upon the occurrence of an instruction prefetch miss, the instruction prefetch miss indicating that a first target instruction is a branch instruction having a second target instruction which is unavailable.

* * * * *